United States Patent
Du et al.

(10) Patent No.: US 9,633,411 B2
(45) Date of Patent: Apr. 25, 2017

(54) LOAD SCHEME FOR SHARED REGISTER IN GPU

(71) Applicant: QUALCOMM Incorporated, San Diego, CA (US)

(72) Inventors: Yun Du, San Diego, CA (US); Andrew Evan Gruber, Arlington, MA (US); Lin Chen, San Diego, CA (US); Guofang Jiao, San Diego, CA (US); Chun Yu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 323 days.

(21) Appl. No.: 14/316,391

(22) Filed: Jun. 26, 2014

(65) Prior Publication Data

US 2015/0379680 A1    Dec. 31, 2015

(51) Int. Cl.
  *G06T 1/60* (2006.01)
  *G06T 15/80* (2011.01)
  *G09G 5/36* (2006.01)

(52) U.S. Cl.
  CPC ............... *G06T 1/60* (2013.01); *G06T 15/80* (2013.01); *G09G 5/363* (2013.01); *G09G 2352/00* (2013.01); *G09G 2360/06* (2013.01)

(58) Field of Classification Search
  None
  See application file for complete search history.

(56) References Cited

U.S. PATENT DOCUMENTS

| 8,464,271 | B2 | 6/2013 | Eichenberger et al. | |
| 2008/0150949 | A1 | 6/2008 | Wei et al. | |
| 2009/0300621 | A1* | 12/2009 | Mantor | G06F 9/30087 718/100 |
| 2011/0252204 | A1 | 10/2011 | Coon et al. | |
| 2012/0320070 | A1 | 12/2012 | Arvo | |
| 2013/0263100 | A1* | 10/2013 | Mizrachi | G06F 8/41 717/149 |
| 2014/0092092 | A1* | 4/2014 | Li | G06F 9/44 345/423 |
| 2014/0366033 | A1* | 12/2014 | Nystad | G06F 9/50 718/104 |
| 2015/0022538 | A1* | 1/2015 | Munshi | G06F 9/5027 345/522 |
| 2015/0178879 | A1* | 6/2015 | Palmer | G06F 9/50 345/506 |

OTHER PUBLICATIONS

International Search Report and Written Opinion from International Application No. PCT/US2015/035332, dated Sep. 24, 2015, 12 pp.
(Continued)

*Primary Examiner* — James A Thompson
(74) *Attorney, Agent, or Firm* — Shumaker & Sieffert, P.A.

(57) ABSTRACT

Techniques are described for determining whether data of a variable for each of a plurality of graphics items is same. If determined that the data is the same, the techniques store the data in a storage location of a specialized shared general purpose register that is associated with the variable.

27 Claims, 6 Drawing Sheets

(56) References Cited

OTHER PUBLICATIONS

Yu, et al., "An Energy-Efficient Mobile Vertex Processor With Multithread Expanded VLIW Architecture and Vertex Caches", IEEE Journal of Solid-State Circuits, IEEE Service Center, Piscataway, NJ, USA, Oct. 2007, XP011193082, vol. 42, No. 10, pp. 2257-2269.

Mantor M., et al., "AMD Graphic Core Next," Fusion Development Summit, Jun. 2011, Slides 1-45.

International Preliminary Report on Patentability from International Application No. PCT/US2015/035332, dated May 9, 2016, 6 pp.

* cited by examiner

LOAD SCHEME FOR SHARED REGISTER IN GPU

TECHNICAL FIELD

This disclosure relates to data storage, and more particularly, to data storage techniques in registers.

BACKGROUND

Processing units, such as graphics processing units (GPUs), include processing elements and a general purpose register (GPR) that stores data for the execution of an instruction. In some examples, a processing element executes instructions for processing one item of data, and respective processing elements store the data of the item or the resulting data of the item from the processing in the GPR. An item of data may be the base unit on which processing occurs. For instance, in graphics processing, a vertex of a primitive is one example of an item, and a pixel is another example of an item. There is graphics data associated with each vertex and pixel (e.g., coordinates, color values, etc.).

There may be multiple processing elements within a processor core of the processing element allowing for parallel execution of an instruction (e.g., multiple processing elements execute the same instruction at the same time). In some cases, each of the processing elements stores data of an item in the GPR and reads the data of the item from the GPR even if the data is the same for multiple items.

SUMMARY

In general, the disclosure describes techniques for storing uniform data in a shared general purpose register (SGPR) of a graphics processing unit (GPU). Each processing unit of a processing core may read or write data of an item, also referred to as a fiber, which is a base unit on which processing occurs. Each item may be associated with multiple variables, and these variables of an item together form the data of a fiber.

In some examples, a plurality of items, referred to as a wave, may have some data that is the same for each of the items in the wave. The techniques described in this disclosure may determine whether at least some data of the items in a wave is the same. In such cases, the processing core may store the data, which is the same for all items in a wave, in the SGPR, and instructions executing on the processing core may read the data from the SGPR. In this way, rather than reading and writing data to GPRs of each of the items, the techniques may read and write data from the SGPR, which may reduce the number of times the GPR is accessed and thereby reduce power consumption.

In one example, the disclosure describes a method of storing data, the method comprising determining whether data of a variable for a plurality of graphics items is the same, wherein the variable is needed for processing each of the plurality of graphics items, wherein the plurality of graphics items are processed with respective processing elements of a shader core of a graphics processing unit (GPU) during execution of a shader program, and wherein each of the graphics items is a base unit on which processing occurs, storing the data in a storage location of a shared general purpose register (SGPR) associated with the variable if the data of the variable of the plurality of graphics items is the same, and storing data for the variable of each of the plurality of graphics items in multiple storage locations of a general purpose register (GPR), separate from the SGPR, if the data of the variable of at least two of the plurality of graphics items is not the same.

In one example, the disclosure describes a device for processing data, the device comprising a graphics processing unit (GPU), the GPU comprising a shader core, the shader core comprising a control unit, a plurality of processing elements, a shared general purpose register (SGPR), and a general purpose register (GPR), wherein the control unit is configured to determine whether data of a variable for a plurality of graphics items is the same, wherein the variable is needed for processing each of the plurality of graphics items, wherein the plurality of graphics items are processed with respective processing elements of the shader core of the GPU during execution of a shader program, and wherein each of the graphics items is a base unit on which processing occurs, store the data in a storage location of the SGPR associated with the variable if the data of the variable of the plurality of graphics items is the same, and store data for the variable of each of the plurality of graphics items in multiple storage locations of the GPR, separate from the SGPR, if the data of the variable of at least two of the plurality of graphics items is not the same.

In one example, the disclosure describes a graphics processing unit (GPU) comprising a shader core, the shader core comprising a plurality of processing elements, a shared general purpose register (SGPR), a general purpose register (GPR) separate from the SGPR, and a control unit configured to determine whether data of a variable for a plurality of graphics items is the same, wherein the variable is needed for processing each of the plurality of graphics items, wherein the plurality of graphics items are processed with respective processing elements of the shader core of the GPU during execution of a shader program, and wherein each of the graphics items is a base unit on which processing occurs, store the data in a storage location of the SGPR associated with the variable if the data of the variable of the plurality of graphics items is the same, and store data for the variable of each of the plurality of graphics items in multiple storage locations of the GPR, separate from the SGPR, if the data of the variable of at least two of the plurality of graphics items is not the same.

In one example, the disclosure describes a computer-readable storage medium having instructions stored thereon that when executed cause one or more processors to determine whether data of a variable for a plurality of graphics items is the same, wherein the variable is needed for processing each of the plurality of graphics items, wherein the plurality of graphics items are processed with respective processing elements of a shader core of a graphics processing unit (GPU) during execution of a shader program, and wherein each of the graphics items is a base unit on which processing occurs, store the data in a storage location of a shared general purpose register (SGPR) associated with the variable if the data of the variable of the plurality of graphics items is the same, and store data for the variable of each of the plurality of graphics items in multiple storage locations of a general purpose register (GPR), separate from the SGPR, if the data of the variable of at least two of the plurality of graphics items is not the same.

In one example, the disclosure describes a device for processing data, the device comprising a graphics processing unit (GPU), the GPU comprising a shader core, the shader core comprising a control unit, a plurality of processing elements, a shared general purpose register (SGPR), and a general purpose register (GPR), wherein the control unit comprises means for determining whether data of a variable for a plurality of graphics items is the same, wherein the variable is needed for processing each of the plurality of graphics items, wherein the plurality of graphics items are processed with respective processing elements of the shader core of the GPU during execution of a shader program, and wherein each of the graphics items is a base unit on which processing occurs, means for storing the data in a storage location of the SGPR associated with the variable if the data of the variable of the plurality of graphics items is the same, and means for storing data for the variable of each of the plurality of graphics items in multiple storage locations of the GPR, separate from the SGPR, if the data of the variable of at least two of the plurality of graphics items is not the same.

The details of one or more examples are set forth in the accompanying drawings and the description below. Other features, objects, and advantages will be apparent from the description, drawings, and claims.

DETAILED DESCRIPTION

Figure 1:
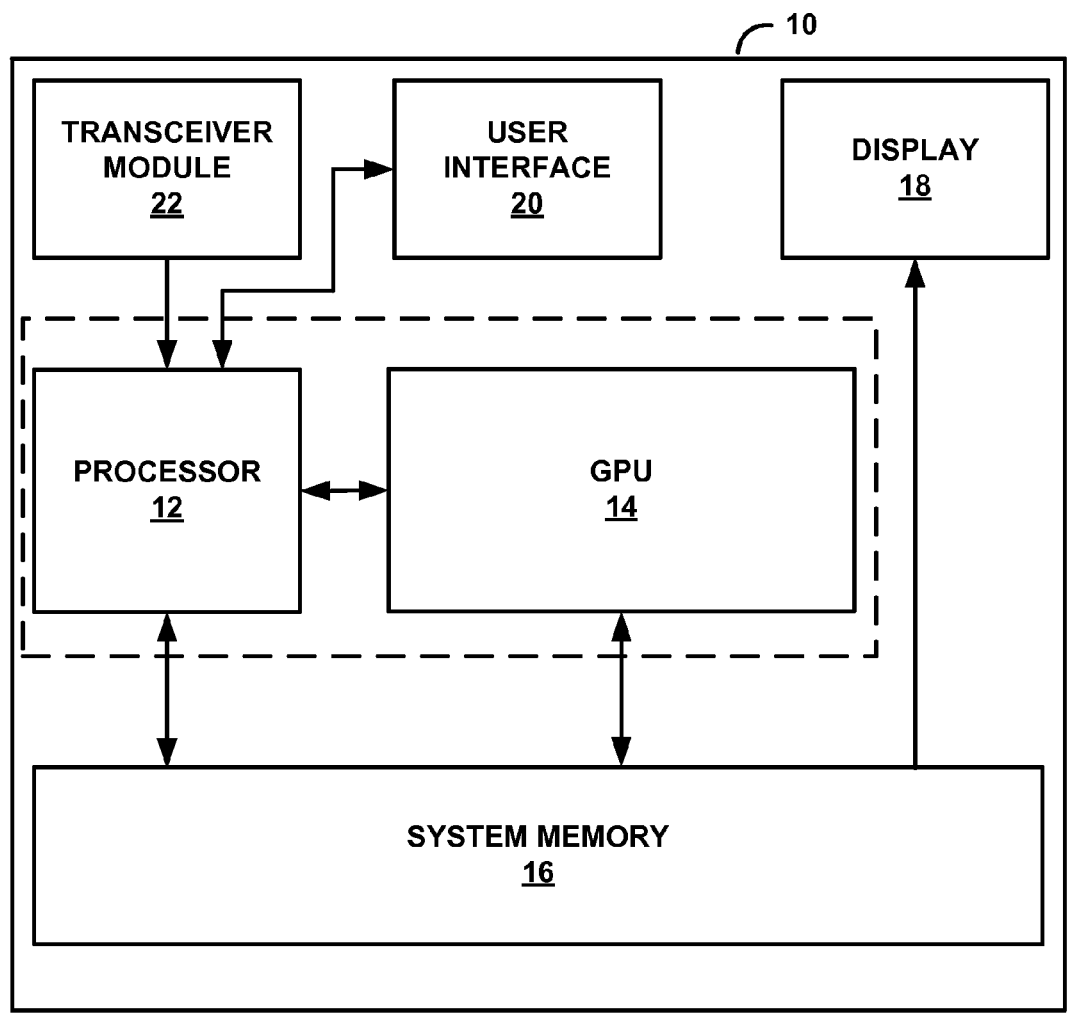
FIG. 1 is a block diagram illustrating an example device for processing data in accordance with one or more example techniques described in this disclosure.

Parallel processing units, such as graphics processing unit (GPUs) that are configured to perform many operations in parallel (e.g., at the same time), include one or more processor cores (e.g., shader cores for a GPU) that execute instructions of one or more programs. For ease of description, the techniques described in the disclosure are described with respect to a GPU or a general purpose GPU (GPGPU). However, the techniques described in this disclosure may be extended to parallel processing units that are not necessarily GPUs or GPGPUs, as well as non-parallel processing units (e.g., ones not specifically configured for parallel processing).

The GPU may be designed with a single instruction, multiple data (SIMD) structure. In the SIMD structure, a shader core includes a plurality of SIMD processing elements, where each SIMD processing element executes instructions of the same program, but on different data. A particular instruction executing on a particular SIMD processing element is referred to as a thread. Each SIMD processing element may be considered as executing a different thread because the data for a given thread may be different; however, the thread executing on a processing element is the same instruction, of the same program, as the instruction executing on the other processing elements. In this way, the SIMD structure allows the GPU to perform many tasks in parallel (e.g., at the same time).

In the SIMD structure, the shader core processes multiple fibers simultaneously using the same operation defined by the single instruction. A fiber refers to a basic item for which processing occurs. For example, for a vertex shader executing on the shader core, a fiber would be a vertex. For a pixel or fragment shader executing on the shader core, a fiber would be a pixel.

Part of SIMD processing includes reading and writing of data needed for processing the multiple fibers. One example of data needed for processing multiple fibers is attribute data of the fibers (e.g., attribute data of a vertex or attribute data of a pixel). For ease of illustration, the techniques are described with respect to attribute data, but the techniques are not so limited. The techniques can be extended to various other data types, and generally to data that is needed for processing a fiber. This data may also include values, such as counter values or other types of values, that are needed for processing a fiber.

For example, to process a fiber, the shader core may process a plurality of variables associated with the fiber. One example of the variables associated with a fiber is the attributes associated with a fiber. One example of the data of a variable is the attribute data of an attribute.

In some shader core designs, the shader core reads data that is the same for most of the fibers (i.e., uniform data) over and over again. For instance, data of one or more variables (e.g., attribute data of one or more attributes) that needs be read for the fibers is non-divergent. The shader core then stores this data in storage locations assigned to the fiber within a general purpose register (GPR), where the GPR is located within the shader core.

As one example, each fiber is associated with a plurality of attribute data. For a vertex or a pixel, the attribute data includes coordinates, color data, opacity, etc., as a few examples. However, there are other types of data needed to process the fiber as well, and the techniques are applicable to such data types. While all of the attribute data may be not be the same for a plurality vertices or pixels, in some cases, some of the attribute data may be same for the plurality of vertices or pixels. The data (e.g., attribute data in this example) that is the same for the plurality of vertices or pixels is referred to as uniform data. The data that is different for at least two of the vertices or pixels is referred to as divergent data (i.e., the data for one vertex is different than the data for at least one other vertex).

Rather than reading the uniform data over and over again for storage in the GPRs and repetitively reading the GPRs for the uniform data, the techniques described in this disclosure determine whether data to be read for a plurality of fibers (the plurality of fibers being referred to as a wave) is non-divergent. If the data to be read for the wave is non-divergent, the techniques described in disclosure read the uniform data one time (e.g., a single time) for storage in a specialized shared general purpose register (SGPR). The shader core then reads the uniform data from the SGPR rather than repeatedly accessing the GPR. The SGPR is a shared GPR in the sense that the SGPR stores data that is needed for all of the fibers of the wave (e.g., stores attribute data that is shared by all of the fibers of a wave).

The number of fibers that form a wave may be a function of the parallel processing capabilities of the shader core. For instance, if the shader core is configured to process thirty-two fibers (as merely one example) simultaneously, then the number of fibers in a wave equals thirty-two.

There may be various ways in which to determine whether some data of the fibers is uniform across a wave. As one example, the compiler executing on a processor may determine whether a particular instruction of a shader program will require access to uniform data for a wave (e.g., an attribute that is the same for the fibers in the wave). In this case, the compiler may encode an instruction indicating the uniform data access. Hardware of the GPU may read this instruction and store the uniform data in the SGPR for the wave (e.g., store the attribute data that is the same for all of the fibers in the wave in the SGPR).

The compiler may not always be able to determine whether data access is uniform across a wave for a particular instruction. However, the compiler may be able to determine that there is a likelihood for a particular instruction to require accessing uniform data across a wave. In such examples, the compiler may encode an instruction identifying a particular instruction as a candidate for using the SGPR. For the identified instruction, hardware of the GPU may determine whether memory addresses to be accessed for data of the fibers of a wave are the same. If the memory addresses are the same, the hardware may set an SGPR flag value as 1, retrieve the data once, and store the uniform data in the SGPR. When the data is needed for processing, the hardware may read the flag value and determine whether the data should be read from the SGPR or the GPR.

In this way, the techniques described in this disclosure may reduce the number of times the GPR needs to be accessed. This in turn may increase power and processing efficiencies. For example, the GPR may be a relatively large memory storage unit that stores the data (e.g., values) for all variables (e.g., attributes) needed for a plurality of different fibers. One SGPR, on the other hand, may store the data for a single variable (e.g., single attribute) that is the same for a wave of fibers. Accordingly, the SGPR may be smaller in size than the GPR. In some cases, accessing the SGPR may require less power than accessing the GPR. By reducing the number of times the GPR needs to be accessed, by accessing the SGPR instead, the techniques may reduce the amount of power the GPU consumes.

As described above, a fiber refers to a base unit on which processing occurs. To avoid confusion, this disclosure refers to a fiber as a graphics item to indicate a base item on which a GPU performs processing. Accordingly, a plurality of graphics items may form a graphics wave. However, in some examples, the GPU may not necessarily perform graphics operations. For such cases, the term graphics item is meant to refer to a base unit on which the GPU performs processing, even if such a graphics item is not for graphics processing. In other words, a graphics item is a base unit on which the GPU performs processing, and examples of a graphics item include an item for graphics related processing or for non-graphics related processing.

FIG. 1 is a block diagram illustrating an example device for processing data in accordance with one or more example techniques described in this disclosure. FIG. 1 illustrates device 10, examples of which include, but are not limited to, video devices such as media players, set-top boxes, wireless handsets such as mobile telephones, personal digital assistants (PDAs), desktop computers, laptop computers, gaming consoles, video conferencing units, tablet computing devices, and the like.

In the example of FIG. 1, device 10 includes processor 12, graphics processing unit (GPU) 14, and system memory 16. In some examples, such as examples where device 10 is a mobile device, processor 12 and GPU 14 may be formed as an integrated circuit (IC). For example, the IC may be considered as a processing chip within a chip package, such as a system on chip (SoC). In some examples, processor 12 and GPU 14 may be housed in different integrated circuits (i.e., different chip packages) such as examples where device 10 is a desktop or laptop computer. However, it may be possible that processor 12 and GPU 14 are housed in different integrated circuits in examples where device 10 is a mobile device.

Examples of processor 12 and GPU 14 include, but are not limited to, one or more digital signal processors (DSPs), general purpose microprocessors, application specific integrated circuits (ASICs), field programmable logic arrays (FPGAs), or other equivalent integrated or discrete logic circuitry. Processor 12 may be the central processing unit (CPU) of device 10. In some examples, GPU 14 may be specialized hardware that includes integrated and/or discrete logic circuitry that provides GPU 14 with massive parallel processing capabilities suitable for graphics processing. In some instances, GPU 14 may also include general purpose processing capabilities, and may be referred to as a general purpose GPU (GPGPU) when implementing general purpose processing tasks (i.e., non-graphics related tasks).

For purposes of illustration, the techniques described in this disclosure are described with GPU 14. However, the techniques described in this disclosure are not so limited. The techniques described in this disclosure may be extended to other types of parallel processing units (e.g., processing units that provide massive parallel processing capabilities, even if not for graphics processing). Also, the techniques described in this disclosure may be extended to processing units not specifically configured for parallel processing.

Processor 12 may execute various types of applications. Examples of the applications include web browsers, e-mail applications, spreadsheets, video games, or other applications that generate viewable objects for display. System memory 16 may store instructions for execution of the one or more applications. The execution of an application on processor 12 causes processor 12 to produce graphics data for image content that is to be displayed. Processor 12 may transmit graphics data of the image content to GPU 14 for further processing.

As an example, the execution of an application on processor 12 causes processor 12 to produce vertices of primitives, where the interconnection of primitives at respective vertices forms a graphical object. In this example, the graphics data that processor 12 produces are the attribute data for the attributes of the vertices. For example, the application executing on processor 12 may generate color values, opacity values, coordinates, etc. for the vertices, which are all examples of attributes of the vertices. There may be additional attributes as well, and in some examples, the application need not produce all of the example attributes. In general, the techniques are extendable to data types (e.g., counters) other than attribute data, and the techniques should not be considered limited to attribute data or limited to examples of attribute data such as color values, opacity values, coordinates, etc.

In some non-graphics related examples, processor 12 may generate data that is better suited to be processed by GPU 14. Such data need not be for graphics or display purposes. For instance, processor 12 may output data on which matrix operations need to be performed by GPU 14, and GPU 14 may in turn perform the matrix operations.

In general, processor 12 may offload processing tasks to GPU 14, such as tasks that require massive parallel operations. As one example, graphics processing requires massive parallel operations, and processor 12 may offload such graphics processing tasks to GPU 14. However, other operations such as matrix operations may also benefit from the parallel processing capabilities of GPU 14. In these examples, processor 12 may leverage the parallel processing capabilities of GPU 14 to cause GPU 14 to perform non-graphics related operations.

Processor 12 may communicate with GPU 14 in accordance with a particular application processing interface (API). Examples of such APIs include the DirectX® API by Microsoft®, the OpenGL® or OpenGL ES® by the Khronos group, and the OpenCL™; however, aspects of this disclosure are not limited to the DirectX, the OpenGL, or the OpenCL APIs, and may be extended to other types of APIs. Moreover, the techniques described in this disclosure are not required to function in accordance with an API, and processor 12 and GPU 14 may utilize any technique for communication.

Device 10 may also include display 18, user interface 20, and transceiver module 22. Device 10 may include additional modules or units not shown in FIG. 1 for purposes of clarity. For example, device 10 may include a speaker and a microphone, neither of which are shown in FIG. 1, to effectuate telephonic communications in examples where device 10 is a mobile wireless telephone. Furthermore, the various modules and units shown in device 10 may not be necessary in every example of device 10. For example, user interface 20 and display 18 may be external to device 10 in examples where device 10 is a desktop computer. As another example, user interface 20 may be part of display 18 in examples where display 18 is a touch-sensitive or presence-sensitive display of a mobile device.

Display 18 may comprise a liquid crystal display (LCD), a cathode ray tube (CRT) display, a plasma display, a touch-sensitive display, a presence-sensitive display, or another type of display device. Examples of user interface 20 include, but are not limited to, a trackball, a mouse, a keyboard, and other types of input devices. User interface 20 may also be a touch screen and may be incorporated as a part of display 18. Transceiver module 22 may include circuitry to allow wireless or wired communication between device 10 and another device or a network. Transceiver module 22 may include modulators, demodulators, amplifiers and other such circuitry for wired or wireless communication.

System memory 16 may be the memory for device 10. System memory 16 may comprise one or more computer-readable storage media. Examples of system memory 16 include, but are not limited to, a random access memory (RAM), an electrically erasable programmable read-only memory (EEPROM), flash memory, or other medium that can be used to carry or store desired program code in the form of instructions and/or data structures and that can be accessed by a computer or a processor.

In some aspects, system memory 16 may include instructions that cause processor 12 and/or GPU 14 to perform the functions ascribed in this disclosure to processor 12 and GPU 14. Accordingly, system memory 16 may be a computer-readable storage medium having instructions stored thereon that, when executed, cause one or more processors (e.g., processor 12 and GPU 14) to perform various functions.

In some examples, system memory 16 may be a non-transitory storage medium. The term "non-transitory" may indicate that the storage medium is not embodied in a carrier wave or a propagated signal. However, the term "non-transitory" should not be interpreted to mean that system memory 16 is non-movable or that its contents are static. As one example, system memory 16 may be removed from device 10, and moved to another device. As another example, memory, substantially similar to system memory 16, may be inserted into device 10. In certain examples, a non-transitory storage medium may store data that can, over time, change (e.g., in RAM).

For example, as described in more detail elsewhere in this disclosure, system memory 16 may store the code for a compiler that executes on processor 12 that performs techniques of one or more examples described in this disclosure. System memory 16 may also store code for shader programs (e.g., a vertex shader, a pixel or fragment shader, a compute shader, etc.) that execute on a shader core of GPU 14.

For example, a compiler executing on processor 12 may determine whether data for a variable (e.g., attribute date for an attribute) of a plurality of graphics items is the same or has a likelihood to be the same. The compiler may indicate whether the data of the plurality of graphics items is the same or has a likelihood to be the same. GPU 14 may receive the indication and a shader core of GPU 14 may read and write the data that is the same for the plurality of graphics items from a specialized shared general purpose register (SGPR), rather than a GPR of the shader core.

The term graphics item is used in this disclosure to refer to a base unit on which GPU 14 performs parallel processing. GPU 14 may process a plurality of graphics items in parallel (e.g., at the same time). For example, a vertex shader may process a vertex, and GPU 14 may execute a plurality of instances of the vertex shader in parallel to process a plurality of vertices at the same time. Similarly, a pixel or fragment shader may process a pixel of a display, and GPU 14 may execute a plurality of instances of the pixel shader in parallel to process a plurality of pixels of the display at the same time. A vertex and a pixel are examples of a graphics item.

For non-graphics related applications, the term graphics item also refers to smallest unit on which GPU 14 performs processing. However, such processing may not be graphics related. According, the term "graphics item" is meant to refer to items that a graphics processing unit (e.g., GPU 14) or a general purpose graphics processing unit (e.g., examples where GPU 14 is functioning as a GPGPU) is to process in parallel. The graphics item may be used for graphical or non-graphical purposes.

In some cases, the term "fiber" is referred to as a base unit on which GPU 14 performs processing. The term "fiber" is synonymous with "graphics item." The massive parallel processing capabilities of GPU 14 allows GPU 14 to process a plurality of fibers at the same time. A plurality of fibers that GPU 14 processes at the same time is referred to as a wave. In this disclosure, a "graphics wave" is synonymous with a wave of fibers. In other words, a plurality of graphics items form a graphics wave.

As described above, GPU 14 provides massive parallel processing capabilities. One way in which GPU 14 provides such parallel processing capabilities is via a single instruction, multiple data (SIMD) structure. In the SIMD structure, GPU 14 executes a plurality of instances of the same program. For instance, graphics processing, and some non-graphics related processing, require the same operations to be performed, but on different data.

For example, GPU 14 may execute shader programs (referred to simply as shaders) that perform graphics or non-graphics related tasks. GPU 14 includes at least one shader core, and the shader programs execute on the shader core. For brevity and ease of description, GPU 14 is described as performing graphics related tasks, but may similarly perform non-graphics related tasks. GPU 14 may execute multiple instances of the shader program to process multiple graphics items at one time. One example of a shader program is a vertex shader. GPU 14 may execute multiple instances of the vertex shader to process multiple vertices at one time (e.g., in parallel). In general, the operations that need to be performed for a vertex are the same as the operations that need to be performed for other vertices.

Although the operations that need to be performed for the vertex is the same, one or more attribute data of each of the vertices may be different. For example, each graphics item (e.g., a vertex or a pixel) is associated with a plurality of attributes. Each attribute includes attribute data. As an example, a vertex of a primitive or a pixel of a display may be defined by coordinates (e.g., x, y, z, w). Each of the vertices and pixels may also be defined by colors (e.g., a red-component, a green-component, blue-component (RGB)). There may also be an opacity value for each vertex or pixel (e.g., an alpha value). The coordinates, color, and opacity are all examples of attributes of a graphics item (e.g., fiber) and there may be more or fewer attributes than the examples.

As described above, the attributes should not be considered limited to coordinates, color, and opacity. Coordinates, color, and opacity are provided merely to assist with understanding. However, for some cases, the attributes of a graphical item may be limited to specific data types (e.g., due to the manner in which a shader program is programmed or due to the manner in which GPU 14 is designed).

In general, each graphics item may be associated with a plurality of variables, and the plurality of variables is needed for processing each of the graphics items. One example of the plurality of variables is the attributes associated with a vertex or pixel. For each variable, there may be data (e.g., values) that define the variable. One example of the data is the attribute data associated with each attribute. In this example, the attributes associated with the vertices or pixels are needed for processing each of the vertices and pixels. To process the attributes, GPU 14 processes the attribute data of the attributes.

For ease of description, the techniques are described with reference to attribute data associated with attributes needed for processing a vertex or a pixel. However, the techniques described in this disclosure are applicable generally to data associated with variables needed to process a graphics item, and the attribute data associated with attributes for a vertex or a pixel is provided for ease of understanding.

For instance, one of the functions of the vertex shader is to multiply the coordinates with a projection matrix (PRJ) matrix. This PRJ matrix may be an example of the attribute of the vertices. For many vertices in a graphical object, the PRJ matrix may be the same. For instance, the color values and the coordinates may be different, but the PRJ matrix may be the same. This PRJ matrix may be considered as an example of OpenGL vertex instance data.

In the techniques described in this disclosure, a shader core of GPU 14 may be configured to determine whether attribute data for one or more attributes is the same for a plurality of graphics items (e.g., the graphics items of a graphics wave). If the attribute data is the same, the shader core of GPU 14 may store the attribute data in a shared general purpose register (SGPR) that is shared by processing elements of the shader core of GPU 14 so that the attribute data can be read from the SGPR, rather than a GPR of the processing elements.

For example, to execute the multiple instances of a shader program, the shader core of GPU 14 includes a plurality of processing elements, and each processing element may execute one instruction of one instance of the shader program. For example, each processing element may execute a first instruction of the shader program at the same time. In this sense, each processing element may be considered as executing a thread of the shader program, where the thread is one instruction of the shader program for a given graphics item.

In some examples, a general purpose register (GPR) stores data for the variables of the graphics items that are to be processed by the processing elements. For instance, each processing element may execute instructions to process one graphics item, and the GPR stores the attribute data for the attributes of the graphics items that are to be processed by respective processing elements. As described in more detail, if the attribute data of an attribute is the same for all graphics items in a graphics wave, and the attributed data is stored in the SGPR, there may be computational and power efficiency gains by accessing the data from the SGPR, rather than the GPR. To assist with understanding, the following describes an example of storage in a GPR.

Figure 2:
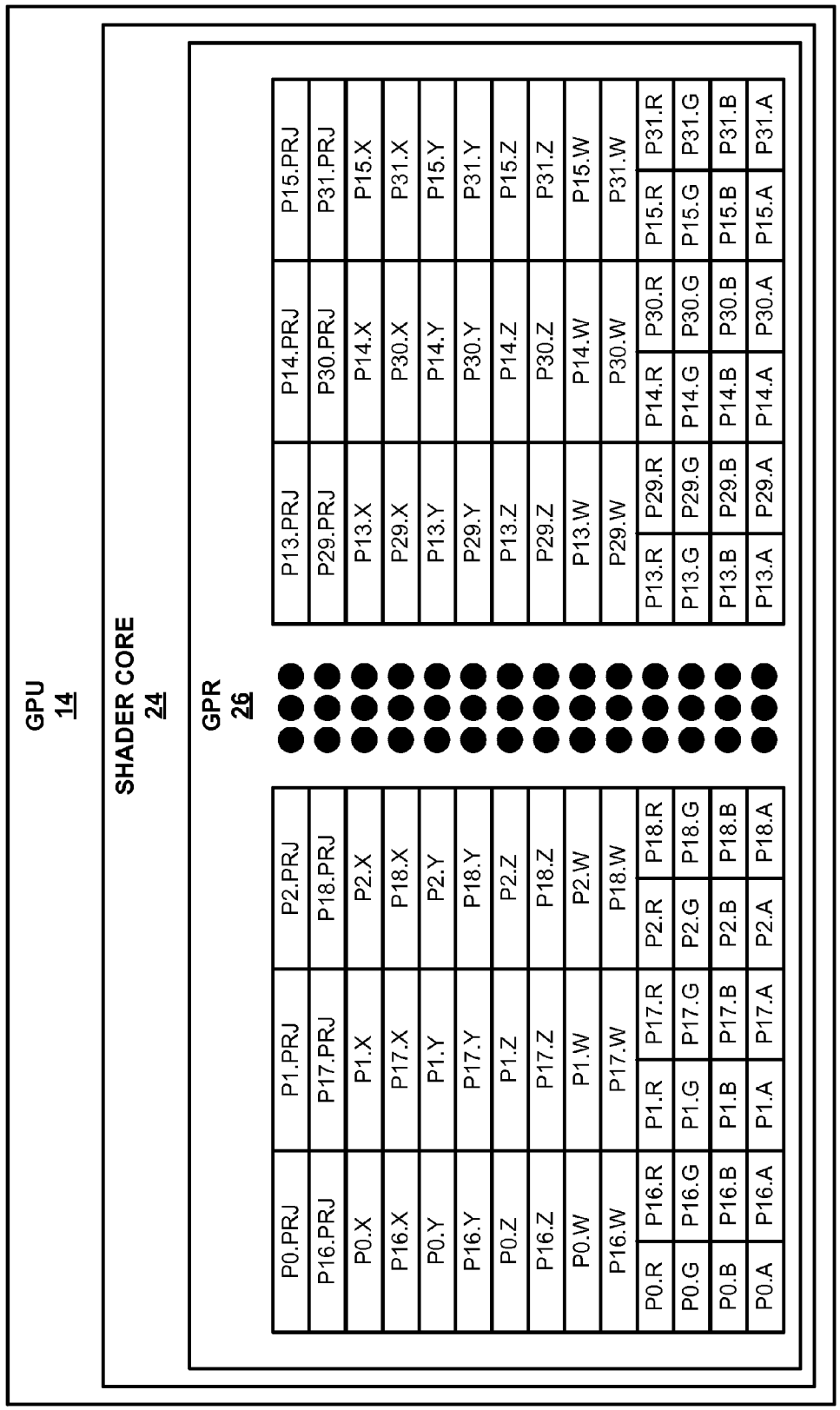
FIG. 2 is a conceptual diagram illustrating an example of data storage in a general purpose register (GPR) of a shader core of a GPU.

FIG. 2 is a conceptual diagram illustrating an example of data storage in a general purpose register (GPR) of a shader core of a GPU. As illustrated, GPU 14 includes shader core 24, and shader core 24 includes GPR 26. Although not illustrated in FIG. 2, shader core 24 includes a plurality of processing elements that each executes an instance of the shader program.

As an example, shader core 24 may include thirty-two processing elements and each may execute one instance of a shader program to process one graphics item. GPR 26 may store data for the graphics items. For instance, GPR 26 may store attribute data for nine attributes for thirty-two graphics items. However, GPR 26 may store data for more or less than nine attributes for the thirty-two graphics items. Also, GPR 26 may store data that is not associated with an attribute of the graphics items, but is the data for a variable needed for processing the graphics items.

In the example illustrated in FIG. 2, the graphics items (e.g., fibers) are identified as P0-P31, which may be vertices. The attribute is identified by the variable following the graphics item identifier. For example, P0.X refers to the x-coordinate for the P0 graphics item, P0.Y refers to the y-coordinate for the P0 graphics item, and so forth. P0.R, P0.G, P0.B, and P0.A refer to the red component, green component, blue component, and opacity of the P0 graphics item, respectively. The other graphics items (e.g., P1-P31) are similarly identified.

In other words, in FIG. 2, vertices P0-P31 are each associated with a plurality of variables. As one example, each of vertices P0-P31 is associated with a variable that identifies the x-coordinate (P0.X to P31.X). Each of vertices P0-P31 is associated with a variable that identifies the y-coordinate (P0.Y to P31Y), and so forth. Each one of these variables is needed for processing each of the plurality of graphics items. For instance, the variable that identifies the x-coordinate is needed for processing each of vertices P0-P31.

As also illustrated in FIG. 2, each of the graphics items also includes a PRJ attribute. The PRJ attribute is a projection matrix that a vertex shader executing on processing elements of shader core 24 may utilize. In this example, the PRJ attribute is another variable that is needed for processing each of vertices P0-P31. For example, the vertex shader may multiply the projection matrix with the respective coordinates (e.g., multiply P0.PRJ with P0.X, P0.Y, P0.Z, and P0.W).

In this sense, GPR 26 may be considered as being both deep and wide. For instance, GPR 26 can store attribute data for many attributes (e.g., deep) and can store attribute date for many graphics items (e.g., wide). While having deep and wide GPRs may be beneficial, there may also be some potential drawbacks. For example, for larger sized GPR, the time needed for accessing values (e.g., data) may be greater than for smaller sized GPRs, causing extra data read pipelines in the processing element (e.g., the processing element being idle while data is being read). Also, accessing the GPR requires the processing element, and hence GPU 14, to consume power, and the amount of power consumption may be proportional to the size of the GPR.

It should be understood that there may be various units in which GPU 14 may store data (e.g., values). GPU 14 may store data in system memory 16 or may store data in local memory (e.g., cache). GPR 26 of shader core 24 is distinct from both system memory 16 and the local memory of GPU 14. For example, system memory 16 is accessible by various components of device 10, and these components use system memory 16 to store data. The local memory of GPU 14 is accessible by various components of GPU 14, and these components use the local memory of GPU 14 to store data. GPR 26, however, may only be accessible by components of shader core 24, and may only store data for the processing elements of shader core 24.

For instance, the local, cache memory of GPU 14 may require GPU 14 to determine cache hits, and the cache memory may be associated in various ways to system memory 16. This may require GPU 14 to perform various cache hit/miss tests, use tags to maintain addresses, and various other storage managing tasks with the cache memory. GPR 26, on the other hand, may be local to, within, and dedicated to shader core 24, and may not need special memory management like local cache memory or system memory 16.

In some cases, the attribute data for one or more attributes of the graphics items stored in GPR 26 may be the same. For example, each of graphics items P0-P31 may be considered as a fiber, and graphics items P0-P31 may be considered as a wave (also referred to as a graphics wave). In some examples, the attribute data for one or more attributes in a graphic wave may be the same.

For instance, graphics items P0-P31 may be vertices and may form a vertex wave of thirty-two vertices. In some cases, a projection matrix (PRJ matrix) may be the same for all thirty-two vertices. As an example, the application executing on processor 12 may determine that GPU 14 should render a bowl turned 90° so that the open side of the bowl is facing the viewer. In this example, the projection for many of the vertices inside the bowl may be the same, but the projection for some of the vertices on the edge (e.g., near or on the rim of the bowl) may be different. In this example, if graphic items P0-P31 are inside the bowl, then the PRJ matrix for P0-P31 is the same (e.g., P0.PRJ is the same as P1.PRJ-P31.PRJ).

In some techniques, regardless of whether the attribute data for an attribute is the same across the graphics wave, shader core 24 requests the attribute data and stores the attribute data in GPR 26. For example, shader core 24 executes instructions to retrieve the attribute data on a per graphics item basis for storage in GPR 26. Shader core 24 may issue memory requests for the attribute data for each graphics item (e.g., each fiber) serially and store the attribute data per-graphics item (e.g., per-fiber) into GPR 26. However, for a SIMD structure, such as that of shader core 24, it may not be power efficient to store uniform data per wave in per graphics item (e.g., per fiber) GPR 26 (e.g., store attribute data that is the same for the graphics items of a graphics wave).

For instance, for the P0.PRJ to P31.PRJ attribute data, in some techniques, shader core 24 may issue memory requests serially for P0.PRJ to P31.PRJ. As an example, a memory storage unit external to shader core 24 may store the projection matrix. This memory storage unit, external to shader core 24, may be a local memory of GPU 14 or even system memory 16. Shader core 24 may issue memory requests to this memory storage unit for each graphics item P0-P31 to receive the projection matrix for each graphics item P0-P31.

For example, shader core 24 executes a first instruction to request the projection matrix for graphics item P0 based on the memory address where the projection matrix for graphics item P0 is stored. Shader core 24 executes a second instruction to request the projection matrix for graphics item P1 based on the memory address where the projection matrix for graphics item P1 is stored, and so forth. If the projection matrix is the same for graphics items P0-P31, then the memory address, in the respective instructions requesting the projection matrix for each of graphics items P0-P31, is likely to be same.

Shader core 24 may then receive each one of P0.PRJ to P31.PRJ attribute data and store P0.PRJ to P31.PRJ attribute data in GPR 26, as illustrated in FIG. 2. In this example, the PRJ matrix may be considered as a constant load (e.g., data that is uniform for the graphics items of a graphics wave). In many cases, the constant load for a constant buffer load (e.g., for loading attribute data into GPR 26) is non-divergent (e.g., P0.PRJ to P31.PRJ are uniform, meaning the same). However, shader core 24 may nevertheless request and read the projection matrix multiple times and store the same projection matrix as P0.PRJ to P31.PRJ in GPR 26.

In accordance with the techniques described in this disclosure, GPU 14 may be configured to determine whether data for one or more variables of graphics items in a graphic wave is uniform across the graphic wave. In such examples, rather than storing the uniform data for the one or more variables in GPR 26, GPU 14 may store the uniform data in a specialized shared GPR (SGPR).

For instance, shader core 24 may include an SGPR. The SGPR may include a plurality of storage locations, where each storage location is associated with one attribute of the plurality of attributes of the graphics items. For instance, as illustrated in FIG. 2, each graphics item P0-P31 includes nine attributes (PRJ, x, y, z, w, R, G, B, and A). In this example, the SGPR may include nine storage locations, where the first location of the SGPR is associated with PRJ attribute, the second location of the SGPR is associated with the x-coordinate, and so forth.

As an illustrative example, the first storage location of the SGPR may be associated with the first two rows of GPR 26 for P0.PRJ to P31.PRJ. The second storage location of the SGPR may be associated with the next two rows for GPR 26 for P0.X to P31.X, and so forth. It should be understood that the first two storage locations of the SGPR being associated with the first two groups of two rows of GPR 26 is provided for purposes of illustration and should not be considered limiting.

In some examples, the first storage location of the SGPR may be associated with the Nth grouping of two rows of GPR 26. As another example, rather than thirty-two graphics items in a graphics wave, there may be only sixteen graphics items in a graphics wave (e.g., fibers P0-P15 are processed in parallel, and fibers 16-31 are not processed in parallel with P0-P15). In this example, the first storage location of the SGPR may be associated with the first row of GPR 26, and so forth; however, like before, any storage location in the SGPR may be associated with any grouping of attributes. In other words, one storage location in the SGPR is associated with one variable for the graphics items in a graphics wave.

In this manner, the SGPR may be smaller than the GPR. For example, the SGPR may be as deep as the GPR, but may not be as wide. In the above example, the SGPR included storage locations for each of the attribute, and therefore, the SGPR may be as deep as the GPR. However, each row of the SGPR may be configured to store only one attribute data for one attribute. For example, in FIG. 2, two rows of GPR 26 can store up to thirty-two x-coordinates (e.g. thirty-two scalar data per wave), if each x-coordinate requires eight bits, then the two rows of GPR 26 store 256 bits (8*32), or 128 bits per row. If the x-coordinates are the same for each of graphics items P0-P31, then the SGPR may store a single 8-bit value. Accordingly, where each row of GPR 26 may be 128 bits wide, each row of the SGPR may be only 8 bits wide.

As described above, if the data for a variable of the graphics items in a graphics wave is uniform, GPU 14 stores the data in the SGPR. For example, assume the PRJ matrix is the same for the graphics wave. In this example, a shader core of GPU 14 may store the attribute data (e.g., PRJ matrix) in a storage location of the SGPR associated with the attribute (e.g., PRJ) if the attribute data of the attribute of the plurality of graphics items is the same. In some examples, it may be possible for GPU 14 to store the uniform attribute data in the SGPR and in GPR 26. When GPU 14 needs to read the attribute data, GPU 14 may read the attribute data (e.g., PRJ matrix) from the SGPR, rather than GPR.

The above described an example where the PRJ matrix may be stored in the SGPR. The PRJ matrix is generally associated with graphical functions. However, the techniques described in this disclosure are not so limited only to graphical functions.

For instance, in some examples, the techniques may also be usable for OpenCL per work group (WG) constant data such as work group identifier (WG ID). For example, in OpenCL, a program that executes on GPU 14 is referred to as a kernel, and a kernel may be split into multiple work groups, where one work group executes at a time per processing element of a shader core of GPU 14 (described in more detail below), as indicated by the WG ID. The kernel may use the WG ID to compute each work item ID and address for loading/storing of the data needed for the work item. The WG ID may be constant (e.g., uniform or the same) for all work items in a work group. In some examples, the WG ID may be loaded into the SGPR to save GPR file foot print and save access power.

Moreover, the techniques described in this disclosure may be extended for purposes in graphical applications other than storage of the PRJ matrix. For example, the techniques described in this disclosure may be extended for the loading of graphics instance identifier (ID) and instance data. For instance, in OpenGL, a drawInstancePrimitives function may be split into multiple instances when executed (e.g., a compiler, as described in FIG. 3, may split this function into multiple instances). For each instance of the drawInstancePrimitives, there is an instance ID and some attribute data (e.g., could be a variety of vertex attribute data type) that is common (e.g., the same or uniform) to all objects in the instance. A vertex shader may apply these common attributes and instance ID, and therefore, it may be possible to store these common attributes and instance ID in the SGPR, rather than GPR to achieve power savings, as well as a reduction in the amount of data stored in the GPR.

In this way, with the SGPR, the techniques may reduce the number of times GPR 26 needs to be accessed both for writing data to and reading data from. Rather, when available, the techniques may read the uniform data for a graphics wave from the SGPR. Accessing the SGPR may require less power than access GPR 26 due to the smaller size of the SGPR. Also, because GPU 14 may determine whether the data is uniform (e.g., the same) for a variable of the graphics items in a graphics wave when the data is requested, the techniques may reduce the number of times load instructions (e.g., instruction to retrieve attribute data) need to be executed.

For instance, the techniques described in this disclosure promote power saving by reducing per-fiber access for uniform data to per-wave access for uniform data. Also, the techniques described in this disclosure promote performance enhancement by reducing redundant per-fiber constant load instruction (e.g., reducing load instruction for uniform data) processing, as well as reducing the issuance and writing back cycles that are wasted for repetitive storing of data that is the same for the entire graphics wave.

Figure 3:
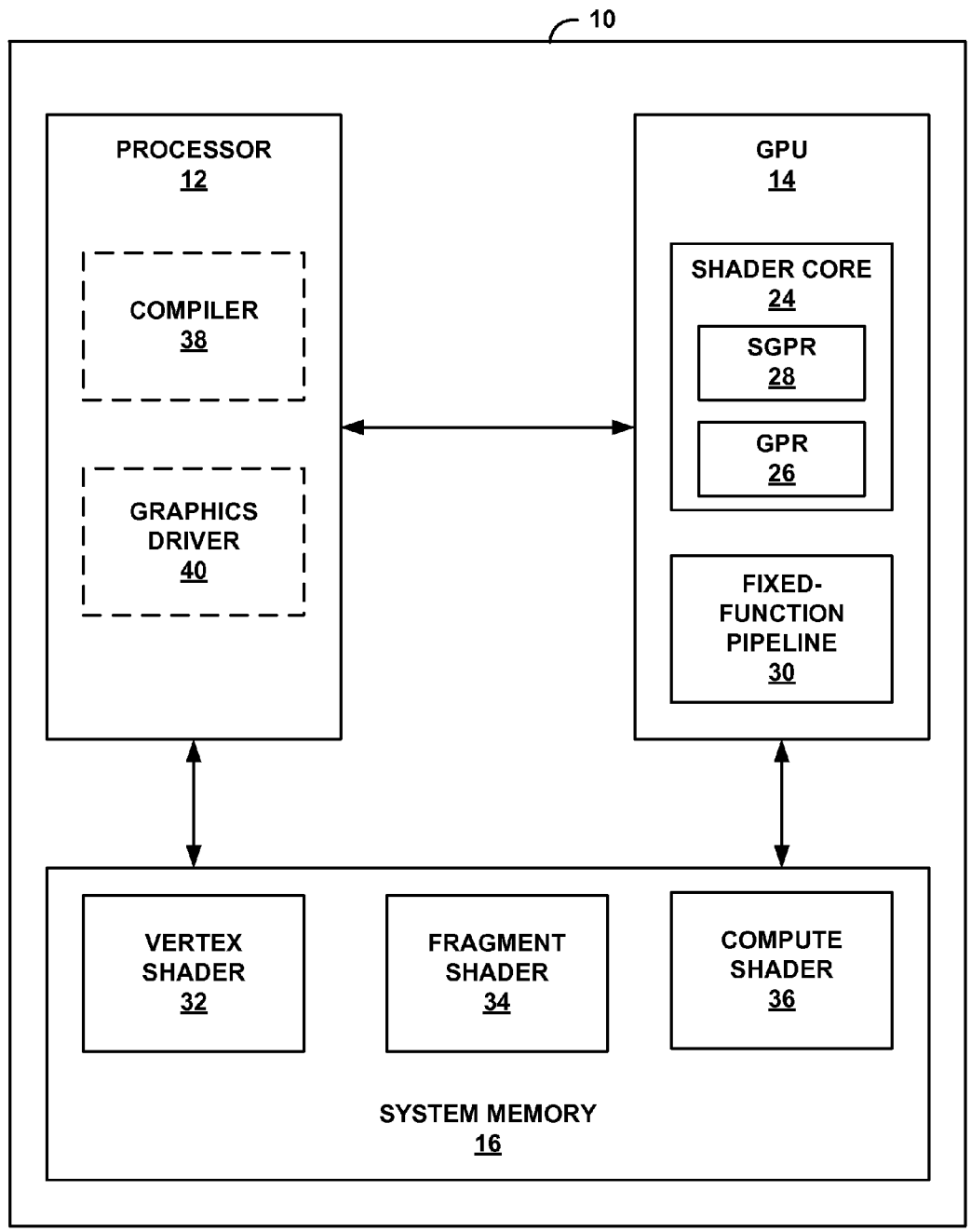
FIG. 3 is a block diagram illustrating components of the device illustrated in FIG. 1 in greater detail.

FIG. 3 is a block diagram illustrating components of the device illustrated in FIG. 1 in greater detail. As illustrated in FIG. 3, GPU 14 includes shader core 24, which includes general purpose register (GPR) 26 and shared GPR (SGPR) 28, and fixed-function pipeline 30. Shader core 24 and fixed-function pipeline 30 may together form a processing pipeline used to perform graphics or non-graphics related functions. The processing pipeline performs functions as defined by software or firmware executing on GPU 14 and performs functions by fixed-function units that are hardwired to perform very specific functions.

As described above, the software or firmware executing on GPU 14 may be referred to as shader programs (or simply shaders), and the shader programs may execute on shader core 24 of GPU 14. Although only one shader core 24 is illustrated, in some examples, GPU 14 may include one or more shader cores similar to shader core 24. Fixed-function pipeline 30 includes the fixed-function units. Shader core 24 and fixed-function pipeline 30 may transmit and receive data from one another. For instance, the processing pipeline may include shader programs executing on shader core 24 that receive data from a fixed-function unit of fixed-function pipeline 30 and output processed data to another fixed-function unit of fixed-function pipeline 30.

Shader programs provide users with functional flexibility because a user can design the shader program to perform desired tasks in any conceivable manner. The fixed-function units, however, are hardwired for the manner in which the fixed-function units perform tasks. Accordingly, the fixed-function units may not provide much functional flexibility.

Examples of the shader programs include vertex shader 32, fragment shader 34, and compute shader 36. Vertex shader 32 and fragment shader 34 may be shader programs for graphics related tasks, and compute shader 36 may be a shader program for a non-graphics related task. In some examples, only graphics related shader programs like vertex shader 32 and fragment shader 34 may be used. In some examples, only non-graphics related shader programs like compute shader 36 may be used. There are additional examples of shader programs such as geometry shaders, which are not described for purposes of brevity.

Graphics driver 40 executing on processor 12 may be configured to implement an application programming interface (API). In such examples, the shader programs (e.g., vertex shader 32, fragment shader 34, and compute shader 36) may be configured in accordance with the same API as graphics driver 40. Although not illustrated, system memory 16 may store the code for graphics driver 40 that processor 12 retrieves from system memory 16 for execution. Graphics driver 40 is illustrated in a dashed box to indicate that graphics driver 40 is software, executing on hardware (e.g., processor 12), in this example. However, some or all of the functionality of graphics driver 40 may be implemented as hardware on processor 12.

In some examples, system memory 16 may store the source code for one or more of vertex shader 32, fragment shader 34, and compute shader 36. In these examples, compiler 38 executing on processor 12 may compile the source code of these shader programs to create object or intermediate code executable by shader core 24 of GPU 14 during runtime (e.g., at the time when these shader programs need to be executed on shader core 24). In some examples, compiler 38 may pre-compile the shader programs and store the object or intermediate code of the shader programs in system memory 16.

System memory 16 may store the code for compiler 38 that processor 12 retrieves from system memory 16 for execution. In the example of FIG. 3, compiler 38 is illustrated in a dashed box to indicate that compiler 38 is software, executing on hardware (e.g., processor 12), in this example. However, some functionality of compiler 38 may be implemented as hardware on processor 12, in some examples.

Graphics driver 40 may be configured to allow processor 12 and GPU 14 to communicate with one another. For instance, when processor 12 offloads graphics or non-graphics processing tasks to GPU 14, processor 12 offloads such processing tasks to GPU 14 via graphics driver 40.

As an example, processor 12 may execute a gaming application that produces graphics data, and processor 12 may offload the processing of this graphics data to GPU 14. In this example, processor 12 may store the graphics data in system memory 16, and graphics driver 40 may instruct GPU 14 with when to retrieve the graphics data, from where to retrieve the graphics data in system memory 16, and when to process the graphics data. Also, the gaming application may require GPU 14 to execute one or more shader programs. For instance, the gaming application may require shader core 24 to execute vertex shader 32 and fragment shader 34 to generate images that are to be displayed (e.g., on display 18 of FIG. 1). Graphics driver 40 may instruct GPU 14 when to execute the shader programs and instruct GPU 14 with where to retrieve the graphics data needed for the shader programs. In this way, graphics driver 40 may form the link between processor 12 and GPU 14.

Graphics driver 40 may be configured in accordance to an API; although graphics driver 40 does not need to be limited to being configured in accordance with a particular API. In an example where device 10 is a mobile device, graphics driver 40 may be configured in accordance with the OpenGL ES API. The OpenGL ES API is specifically designed for mobile devices. In an example where device 10 is a non-mobile device, graphics driver 40 may be configured in accordance with the OpenGL API.

Shader core 24 may be configured to execute many instances of the same instruction of the same shader program in parallel. For example, graphics driver 40 may instruct GPU 14 to retrieve vertex values for a plurality of vertices, and instruct GPU 14 to execute vertex shader 32 to process the vertex values of the vertices. In this example, shader core 24 may execute multiple instances of vertex shader 32, and do so by executing one instance of vertex shader 32 on one processing element of shader core 24 for each of the vertices.

Each processing element of shader core 24 may execute the same instruction of vertex shader 32 at the same instance; however, the particular vertex values may be different because each processing element is processing a different vertex. As described above, each processing element may be considered as executing a thread of vertex shader 32, where a thread refers to one instruction of vertex shader 32 that is processing a particular vertex. In this manner, shader core 24 may execute many instances of vertex shader 32 to process vertex values of a plurality of vertices in parallel (e.g., at the same time).

Shader core 24 may similarly execute many instances of fragment shader 34 to process pixel values of a plurality of pixels in parallel or execute many instances of compute shader 36 to process many non-graphics related data in parallel. In this manner, shader core 24 may be configured in single instruction, multiple data (SIMD) structure. For ease of description, the following is described with respect to a generic shader program, examples of which include vertex shader 32, fragment shader 34, compute shader 36, and other types of shaders such as geometry shaders.

In the techniques described in this disclosure, SGPR 28 may store data (e.g., attribute data) for a variable (e.g., an attribute) for graphics items in a graphics wave that are uniform. There may be various ways in which to determine whether the data is uniform across the graphics wave.

For example, compiler 38 may be aware of SGPR 28 (i.e., SGPR 28 is visible to compiler 38). In other words, compiler 38 is designed with functionality the uses SGPR 28. In some examples, compiler 38 may ensure that instead of storing per-wave uniform data into per-fiber GPR 26, that shader core 24 stores per-wave uniform data in SGPR 28 (e.g., thirty-two scalar data per wave). Compiler 38 may utilize different example techniques to allow constant load for non-divergent data into SGPR 28.

As one example, while compiling a shader program (e.g., vertex shader 32, fragment shader 34, or compute shader 36), compiler 38 may determine whether the shader program requires accessing uniform data. In this context, a shader program requiring access to uniform data means that each thread of the shader program executing on respective processing elements of shader core 24 each requests the same data for at least one variable of the graphics items.

For example, compiler 38 may generate uniform data such as a for-loop counter. This for-loop counter may be the same for all execution instances of the shader program, which means that the for-loop counter is the same for processing each graphics item. This for-loop counter may be an example of data of a variable for the graphics items. In this example, compiler 38 may determine that the for-loop counter is data for a variable of the graphics items that is uniform across all graphics items in the graphics wave.

As another example, the shader program may include branching instructions (e.g., if/then/else instructions). For some particular branch, the shader program may include an instruction that sets one or more variables equal to a constant value (e.g., an instruction that sets all x, y, z, and w coordinates equal to 0). In this example, compiler 38 may determine that the constant value is data for a variable of the graphics items that is uniform across all graphics items in the graphics wave.

If compiler 38 determines that the shader program requires accessing uniform data across the graphics wave, compiler 38 may include an explicit instruction that indicates to shader core 24 that the data is uniform across the graphics wave. In this example, shader core 24 may issue a request for the uniform data from memory (e.g., local memory or system memory 16) for the variable for a first graphics item, and may store the data in SGPR 28 rather than GPR 26. However, because the data for the variable is the same for the graphics wave, shader core 24 may not issue a request for the other graphics items. For example, shader core 24 may convert per-graphics item (e.g., per-fiber) constant load to a per-wave constant load, and the store the data to SGPR 28. In this manner, shader core 24 may not need to issue unnecessary memory requests which saves per-fiber instruction processing cycles, memory request issuing cycles, and return data writing back cycles.

As described above, SGPR 28 may include a plurality of storage locations, where each storage location is associated with a single variable (e.g., attribute) of the variables (e.g., attributes) of the graphics items that form the graphics wave. As also described above, SGPR 28 is viewable by compiler 38. For example, compiler 38 may assign each of the storage locations of SGPR 28 with a unique identifier (SGPR ID). Compiler 38 may transmit the SGPR ID for the storage location associated with the attribute which has the uniform attribute data. Shader core 24 may then store the uniform attribute data for the graphics wave in the SGPR 28 storage location identified by the SGPR ID.

In these examples, for instructions that use the data, the processing elements of shader core 24 may retrieve the data from the SGPR ID associated with the storage location for the attribute. In such examples, the techniques may further reduce power consumption by not accessing GPR 26, and accessing SGPR 28 instead.

In examples where compiler 38 determines that data of the graphics items of a graphics wave are divergent (e.g., non-uniform), compiler 38 may not include the instructions indicating the uniform data access. In these examples, shader core 24 may request the data for each of the graphics items, and store the data in GPR 26. For example, shader core 24 may request from memory the attribute data for the first attribute of a first graphics item, request from memory the attribute data for the first attribute of a second graphics item, and so forth. In the uniform attribute data scenario, shader core 24 may request attribute data only once for the graphics items of the graphic wave, and store the attribute data in SGPR 28.

In some cases, compiler 38 may not determine that data for a variable is uniform across the graphics wave, but may not also determine that data for a variable is necessarily divergent in the graphics wave. In other words, compiler 38 may determine that there is a likelihood that attribute data for an attribute is uniform (e.g., "MAYBE" there is uniform access for the attribute data of a particular attribute).

In such examples, compiler 38 may alias the storage locations of SGPR 28 with the attributes of the graphics items stored in GPR 26, and indicate such aliasing to shader core 24. As one example, assume each graphics item is associated with eight attributes. In this example, compiler 38 may alias identifiers (IDs) R48-R55 with GPR IDs 0-7 (e.g., with attributes 0-7 of the graphics item). In this example, IDs R48-R55 may be reserved identifiers, and shader core 24 may be configured to determine that when IDs R48-R55 are used, then compiler 38 determined that there is a likelihood that attribute data for at least one of the attributes of the graphics items is the same.

The aliasing of storage locations of SGPR 28 and GPR 26 may mean that compiler 38 may access and allocate both SGPR space and GPR space for destination. In other words, compiler 38 may allow for data to be stored in SGPR 28 or GPR 26. For example, compiler 38 may include instructions in the shader program that indicate that an attribute data should be stored to one of these identifiers. If shader core 24 determines that the attribute data is uniform, shader core 24 may store the attribute data to the storage location of SGPR 28 identified by the aliasing identifier. If shader core 24 determines that the attribute data is divergent, shader core 24 may store the attribute data to GPR 26 based on the aliasing identifier. An example of the use of the aliasing identifier is described in the more detail with respect to FIGS. 5A and 5B.

As described above, shader core 24 may be configured to determine whether the data is uniform or divergent. There may be various ways in which shader core 24 may determine whether data is uniform or divergent. As one example, shader core 24 may monitor the memory addresses requested by each of the processing elements for each of the variables. These memory addresses may be for a memory address of local memory of GPU 14 or memory address of system memory 16.

If the memory addresses are the same, shader core 24 may determine that the data for a variable of each of the graphics items, being processed by respective processing elements of shader core 24, is uniform. For instance, if the memory address of where the data is to be retrieved from is the same for each of the graphics items, then it may be likely that data being requested for by the processing elements processing the graphics items is the same.

In some examples, if shader core 24 determines that the memory addresses for data of a variable of the graphics items of a graphics wave is the same, shader core 24 may assert a uniform valid flag (e.g., set a uniform valid flag equal to 1) that indicates that the data of a variable is uniform. Then, when writing the requested data, shader core 24 may first determine the value of the uniform valid flag, and store the uniform data (e.g., one instance of the data) in the storage location of SGPR 28 identified by the aliasing identifier if the uniform valid flag is asserted.

The uniform valid flag is associated with the SGPR 28 storage location associated with the aliasing identifier. For example, each storage location of SGPR 28 may also be associated with a uniform valid flag. If the attribute data for an attribute associated with a particular storage location of SGPR 28 is uniform, as determined by shader core 24, shader core 24 may assert (e.g., set flag value to 1) the uniform valid flag associated with that storage location. If the attribute data for an attribute associated with a particular storage location of SGPR 28 is divergent, as determined by shader core 24, shader core 24 may not assert the uniform valid flag (e.g., set a uniform valid flag equal to 0) associated with that storage location.

For instance, if shader core 24 determines that at least one memory address for attribute data of an attribute of the graphics items is not the same as the others, shader core 24 may not assert the uniform value. Then, when writing the requested attribute data, shader core 24 may first determine the value of the uniform valid flag, and store the attribute data (e.g., the divergent attribute data of an attribute of each of the graphics items) in the storage locations of GPR 26 associated with the aliasing identifier if the uniform valid flag is not asserted.

In some examples, for instructions of the shader program that then use the attribute data, compiler 38 may include as an operand the aliasing identifier of the storage location of SGPR 28 associated with the attribute data in these instructions. Shader core 24 then reads the uniform valid flag value and determines whether the attribute data is stored in SGPR 28 or GPR 26. For instance, if the uniform valid flag is asserted, shader core 24 may determine that the attribute data is stored in the SGPR 28, and if the uniform valid flag is not asserted, shader core 24 may determine that the attribute data is stored in GPR 26.

Figure 4:
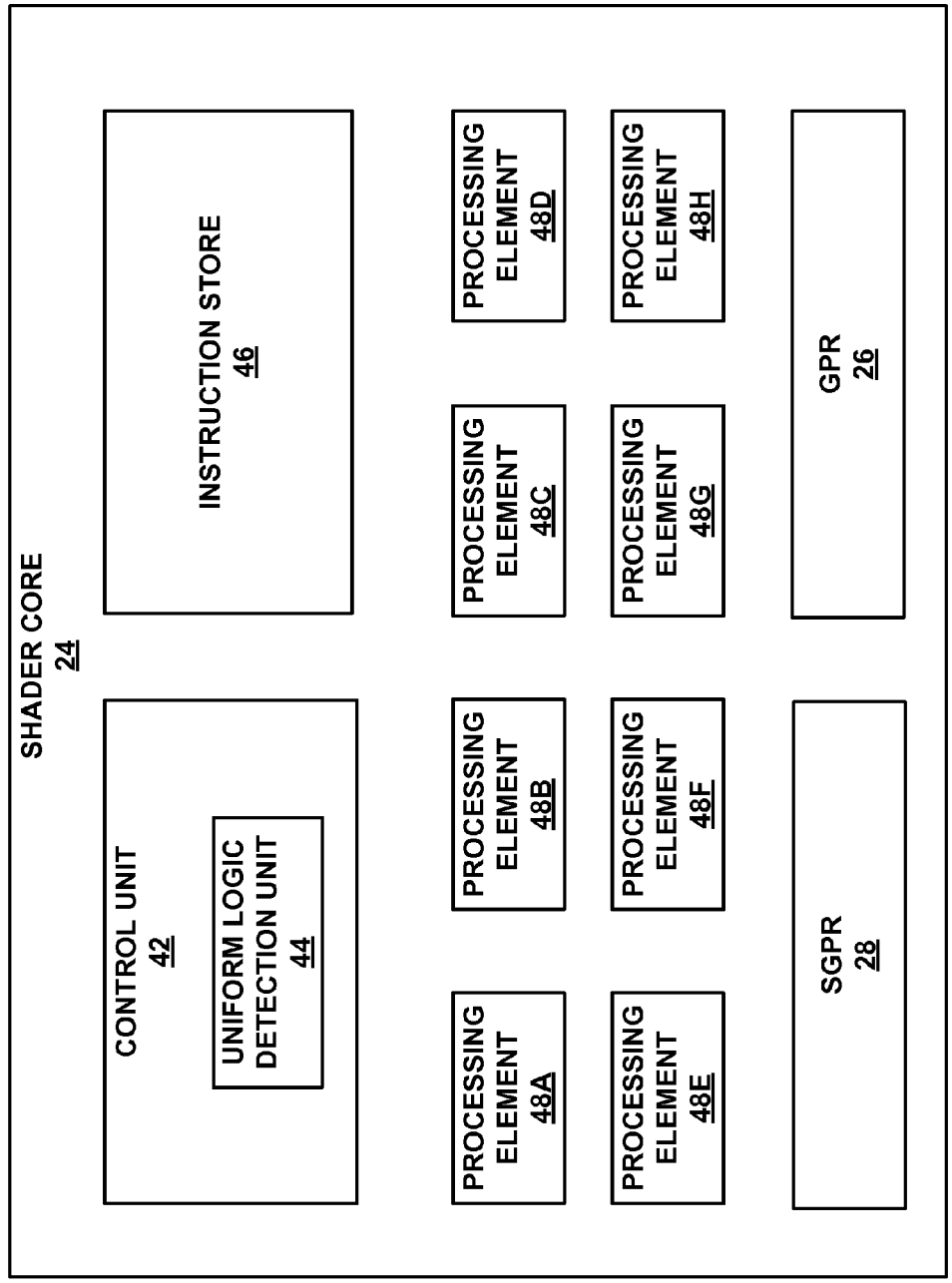
FIG. 4 is a block diagram illustrating one example of a shader core of a GPU of FIG. 3 in greater detail.

FIG. 4 is a block diagram illustrating one example of a shader core of a GPU of FIG. 3 in greater detail. For instance, FIG. 4 illustrates one example of shader core 24 of GPU 14. Shader core 24 may include control unit 42, which includes uniform logic detection unit 44, instruction store 46, one or more processing elements 48A-48H (collectively referred to as "processing elements 48"), GPR 26, and SGPR 28. Although FIG. 4 illustrates eight processing elements 48, there may be more or fewer than eight processing elements 48 in other examples. Processing elements 48 are examples of processing elements on which instances of the shader program execute in parallel.

Control unit 42 may control the functionality of shader core 24. For example, control unit 42 may retrieve the instructions that are to be executed by processing elements 48 and store the instructions in instructions store 46. Also, control unit 42 may retrieve the attribute data that processing elements 48 are to process and store the attribute data in GPR 26 and/or SGPR 28.

For example, as illustrated control unit 42 includes uniform logic detection unit 44. Uniform logic detection unit 44 may be hardware of shader core 24, software executing on shader core 24, or a combination of the two. Although uniform logic detection unit 44 is illustrated as being part of control unit 42, the techniques described in this disclosure are not so limited. In general, uniform logic detection unit 44 is illustrated to assist with understanding, and may be separate unit from control unit 42, a specialized unit within control unit 42, or integrated with control unit 42.

In the techniques described in this disclosure, uniform logic detection unit 44 is one example of the unit configured to implement the example techniques. For instance, each one of processing elements 48 may process one graphics item. To process respective graphics items, each one of processing elements 48 may execute instances of the shader program.

For example, each one of processing elements 48 may execute an instruction that requests data (e.g., attribute data) for a variable (e.g., attribute) of each of the graphics items being processed by respective processing elements 48. Uniform logic detection unit 44 may determine whether the instructions requesting the data are requesting the data from the same memory address, where the memory address is for local memory of GPU 14 or system memory 16. If uniform logic detection unit 44 determines that the memory address for the data for the variable of each of the graphics items is the same, uniform logic detection unit 44 may issue the request for the data one time and retrieve the data one time, rather than retrieve data multiple times for each multiple requests of the data.

Uniform logic detection unit 44 may also assert the uniform valid flag for the storage location within SGPR 28 associated with the variable and write the retrieved data to the storage location of SGPR 28. In some examples, uniform logic detection unit 44 may not write the data to GPR 26 (although writing to GPR 26 may still be possible). Then, when each of processing elements 48 executes an instruction that requires the data of the variable, control unit 42 may retrieve the data from the storage location of SGPR 28 associated with the variable. For example, only one request to SGPR 28 may be needed to retrieve the data for all processing elements 48 at one time.

If uniform logic detection unit 44 determines that the memory address for at least one of the requested data is different (e.g., at least two of the memory addresses are different from one another), uniform logic detection unit 44 may issue each one of the requests for the data and may not store the data in SGPR 28, and may instead store the data in GPR 26. Then, when each of processing elements 48 executes an instruction that requires the data of the variable, control unit 42 may retrieve the data from the storage locations of GPR 26. For example, multiple requests (e.g., one for each processing elements 48) may be needed to retrieve the data for each one of processing elements 48.

Instruction store 46 may be memory capable of storing instructions such as, but not limited to volatile memory, non-volatile memory, a cache, random access memory (RAM), static RAM (SRAM), dynamic RAM (DRAM), etc. Control unit 42 may be hardwired circuitry of shader core 24 that controls the components of shader core 24. However, it may be possible for control unit 42 to be formed at least in part by software or firmware, executing on hardware, of shader core 24.

Processing elements 48 are configured to execute threads of a shader program. Each of processing elements 48 may execute a different thread. For example, each of processing elements 48 may execute an instance of an instruction of a shader program with respect to potentially different graphics items. Processing elements 48 may be single-instruction, multiple-data (SIMD) processing elements. SIMD processing elements refer to processing elements that, when activated, are configured to execute the same instruction at the same time with respect to different data. This may allow processing elements 48 to execute a plurality of threads of a shader program in parallel with respect to different data items. In some cases, each of processing elements 48 may execute instructions of a shader program based on a common program counter that points to an instruction contained in instruction store 46.

If one or more of processing elements 48 are deactivated by control unit 42, then such processing elements 48 do not execute a program instruction for a given instruction cycle. In some cases, control unit 42 may deactivate one or more of processing elements 48 to implement conditional branch instructions where the branching condition is satisfied for some threads and not satisfied for other threads.

In some examples, each of processing elements 48 may include and/or correspond to one or more arithmetic logic units (ALUs). In further examples, each of processing elements 48 may implement ALU functionality. ALU functionality may include addition, subtraction, multiplication, etc.

Figure 5A:
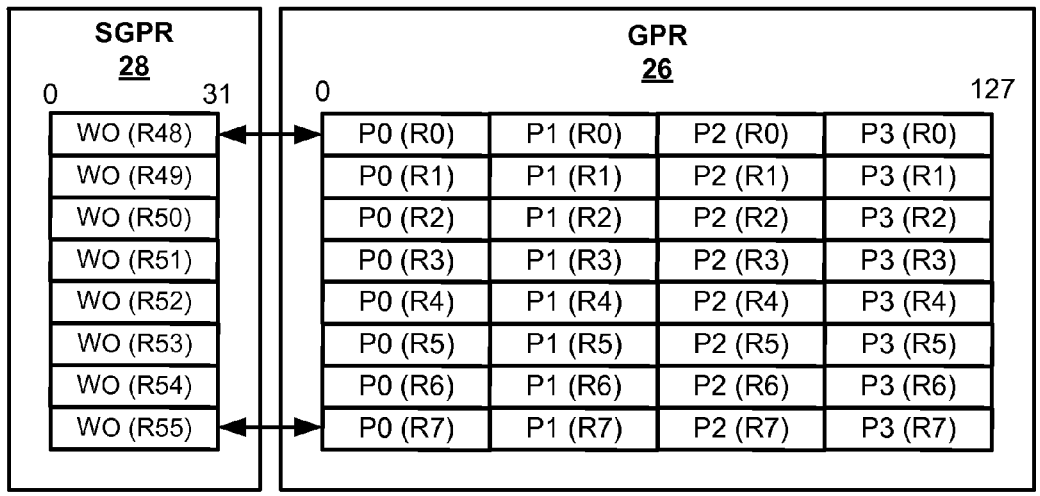
FIGS. 5A and 5B are conceptual diagrams illustrating examples of data storage in accordance with the techniques described in this disclosure.
Figure 5B:
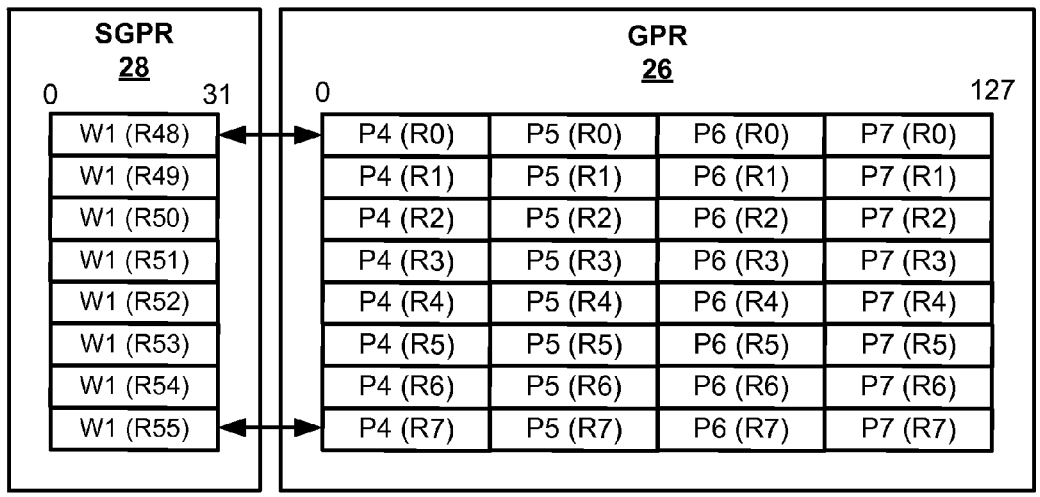

FIGS. 5A and 5B are conceptual diagrams illustrating examples of data storage in accordance with the techniques described in this disclosure. In the example of FIGS. 5A and 5B, each graphics item is associated with eight attributes. For example, FIG. 5A illustrates an example where four graphics items P0-P3 form a first graphics wave, and FIG. 5B illustrates an example where four graphics items P4-P7 form a second graphics wave.

It should be understood that FIGS. 5A and 5B illustrate only a portion of GPR 26, and particularly only the portion of GPR 26 that maps to SGPR 28. In general, GPR 26 is configured to store additional data that does not map to a storage location of SGPR 28. For instance, GPR is a general register used for a variety of storage purposes, while SGPR 28 may be used, in some non-limiting examples, to store only data that is uniform or has a likelihood of being uniform across a graphics wave. In other words, of all the data that is stored in GPR 26, it may be possible for a portion of such data to be stored in SGPR 28. For ease of illustration, FIGS. 5A and 5B illustrate the data of GPR 26 that can be stored in SGPR 28 (where in FIG. 5A, the data is uniform for storage in SGPR 28, and where in FIG. 5B, the data is not uniform and cannot be stored in SGPR 28).

In these examples, each of graphics items P0-P3 are associated with variables R0-R7, and similarly, each of graphics items P4-P7 are associated with variables R0-R7. In the examples illustrated in FIGS. 5A and 5B, IDs R48-R55 are associated with variables R0-R7, respectively. It should be understood that IDs R48-R55 being associated with variables R0-R7 is merely one example, and IDs R48-R55 may be associated with any one of variables R0-R7. In FIG. 5A, W0 refers to the graphics wave that includes graphics items P0-P3, and in FIG. 5B, W1 refers to the graphics wave that includes graphics items P4-P7.

In FIGS. 5A and 5B, processing elements 48A-48D (only four processing elements 48 may be needed) of shader core 24 may implement the following instructions:

LDC R48, m[x]; // load constant memory location x to R48;

Add R1, R48, 0x1; // R1=R48+1

In the example of FIG. 5A, the first storage location of SGPR 28 is associated with variable R0 and has the SGPR ID of R48. In the example of FIG. 5B, the first storage location of SGPR 28 is associate with variable R0 and has the SGPR ID of R48. In FIG. 5A, four processing elements 48 of shader core 24 are each processing respective graphics items P0-P3 at the same time, and in FIG. 5B, four processing elements 48 of shader core 24 are each processing graphics items P4-P7 at the same time.

In the examples of FIGS. 5A and 5B, each of the four processing elements 48 of shader core 24 executes the LDC R48, m[x] instruction to issue a request to load the value stored at memory location x. The memory address for memory location x is for the data of variable R0 for graphics items P0-P3 in FIG. 5A and for the data of variable R0 for graphics items P4-P7. Uniform logic detection unit 44 may determine whether the address for memory location x is the same for all of the memory requests from the four processing elements 48.

Assume that in the example of FIG. 5A, the address for memory location x is the same for the four processing elements 48, and in the example of FIG. 5B, the address for memory location x is different for at least one of the four processing elements 48 (e.g., there are at least two addresses that are different from one another). Accordingly, in the example of FIG. 5A, shader core 24 (e.g., uniform logic detection unit 44 of control unit 42) may determine that the memory address for the data of variable R0 is the same for graphics items P0-P3, and in the example of FIG. 5B, shader core 24 (e.g., uniform logic detection unit 44 of control unit 42) may determine that the memory address for the data of at least one variable R0 is different for graphics items P4-P7 (e.g., the memory address for the data of at least two variables R0 is different from each other).

In the example illustrated in FIG. 5A, shader core 24 (e.g., via control unit 42) may load the data of variable R0 to the first storage location of SGPR 28, which is identified as R48, rather than as R0 in storage locations of GPR 26 reserved for graphics items P0-P3. In this example, shader core 24 (e.g., via control unit 42) may issue one read request, and not issue a read request for each of the processing elements processing respective ones of graphics items P0-P3. Also, in this example, shader core 24 (e.g., via control unit 42) may write the data for variable R0 once, and not write the data for variable R0 four times. Then, for the next instruction (R1=R48+1), processing elements 48A-48D of shader core 24 may read the value of variable R0 from SGPR 28, rather that read the data four times from GPR 26. In this way, the techniques may save memory request issuing cycles and return data by writing cycles if the constant load in a wave is uniform.

In the example illustrated in FIG. 5B, shader core 24 (e.g., via control unit 42) may load the data of each variable R0 identified by the memory address of memory location x to storage locations of GPR 26. For example, shader core 24 (e.g., via control unit 42) may execute each of the four requests for the attribute data for variable R0 for graphics items P4-P7 because the memory location x is different for at least one of the four graphics items P4-P7. Then for the next instruction (R1=R48+1), processing elements 48A-48D of shader core 24 may read the respective data of variable R0 from GPR 26 for each respective storage location for graphics items P4-P7.

As described above, SGPR 28 is smaller than GPR 26. As one example, SGPR 28 may include one column and the same number of rows as GPR 26. In this way, SGPR 28 may be as deep as GPR 26, but may not be as wide. As illustrated in FIGS. 5A and 5B, one row of SGPR 28 can store thirty-two bits, but one row of GPR 26 can store 128 bits. As another example, it may be possible for SGPR 28 to include a plurality of columns, where the number of columns is based on the number of attributes, and include one row. In general, each storage location of SGPR 28 is associated with a variable and may be configured to store the data for respective variable of respective graphics items if the data for the respective variables is the same.

Figure 6:
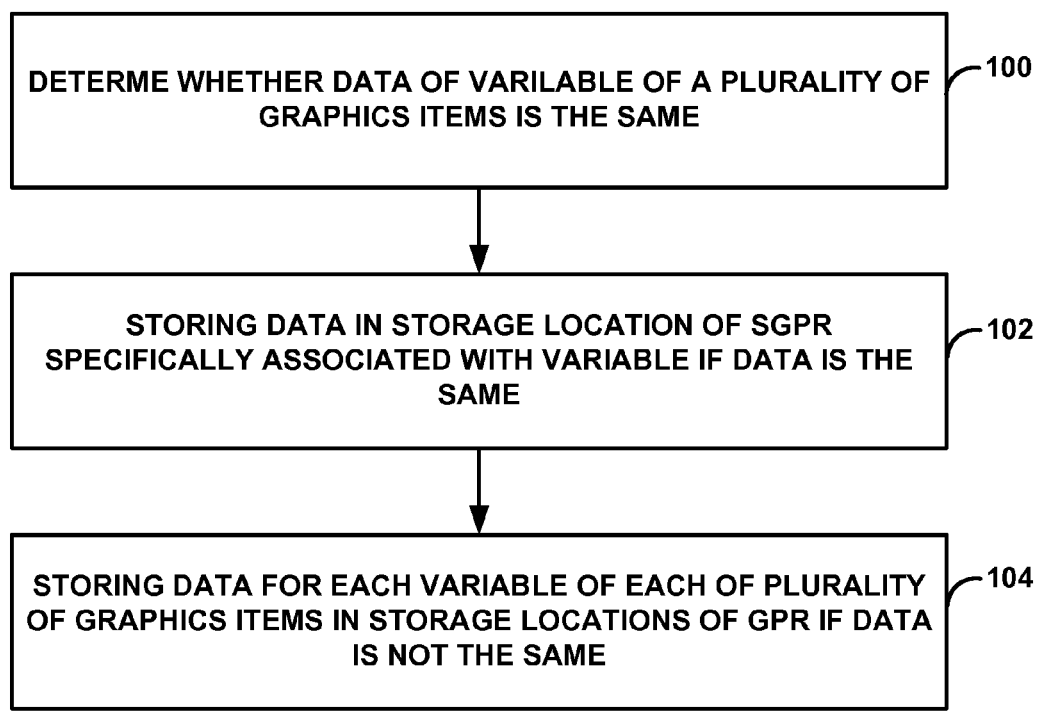
FIG. 6 is a flowchart illustrating an example technique of storing data.

FIG. 6 is a flowchart illustrating an example technique of storing data. As illustrated in FIG. 6, shader core 24 (e.g., via uniform logic detection unit 44 of control unit 42) may determine whether data of a variable of a plurality of graphics items is the same (100). In this example, the plurality of graphics items are processed with respective processing elements 48 of shader core 24 of GPU 14 during execution of a shader program (e.g., vertex shader 32, fragment shader 34, or compute shader 36).

In general, the variable of a plurality of graphics items refers to a variable that is needed for processing each of the plurality of graphics items. As one example, each of the plurality of graphics items may be associated with an x, y, z, and w coordinate, a red component value, a green component value, a blue component value, and an opacity value. In this example, the x, y, z, and w coordinates are each one example of a variable that is needed for processing each of the plurality of graphics items, the red, green, and blue component and opacity values are each also one example of a variable that is needed for processing each of the plurality of graphics items. As another example, a counter value may be a variable that is needed for processing each of the plurality of graphics items.

In some examples, the data of the variable (e.g., the value of the variable) may be different for the plurality of graphics items. For instance, one of the red, green, or blue component values for at least one of the graphics items may be different than the red, green, or blue component values for the other graphics items of the plurality of graphics items may be different. However, in some examples, the data of the variable may be the same for the plurality of graphics items. For instance, a PRJ matrix values of a PRJ matrix may be the same for all of the plurality of graphics items. In the techniques described in this disclosure, if the data of the variable is the same for a plurality of graphics items, the data may be stored in the SGPR, which reduces access times and promotes power efficiency gains.

In some examples, control unit 42 of shader core 24 may determine whether an instruction in a shader program, included by compiler 38, indicates that the data of the variable of the plurality of graphics items is the same to determine whether the data of the variable of the plurality of graphics items is the same. As another example, control unit 42 (via uniform logic detection unit 44) may determine whether memory addresses requested by processing elements 48 for the data of the variable, for processing respective graphics items, is the same. In these examples, control unit 42 may determine that the data of the variable is the same for all of the graphics items if all of the memory addresses are the same, and control unit 42 may determine that the data of the variable is not the same for at least one of the graphics items if all of the memory addresses are not the same (e.g., there are at least two graphics items with different data).

Shader core 24 (e.g., via control unit 42) may store the data in a storage location of SGPR 28 associated with the variable if the data of the variable of the plurality of graphics items is the same (102). For example, in FIG. 5A, the first storage location of SGPR 28, identified as R48, is associated with variable R0 for graphics items P0-P3. Also, R48 is associated with the storage locations of GPR 26 that store the data of variable R0 for graphics items P0-P3. In this way, if data is stored in SGPR 28, R48 refers to the first storage location of SGPR 28. If data is stored in GPR 26, R48 refers to the storage locations of GPR 26 that store data for variable R0 for respective graphics items P0-P3.

In some examples, if the data of the variable of the plurality of graphics items is the same, control unit 42 may issue only one request for the data from a memory address that is the same for the variable for all of the graphics items. Control unit 42 may then retrieve the data only once for storage in the storage location of SGPR 28 associated with the variable. In some examples, control unit 42 may assert a uniform valid flag if determined that the data of the variable of the plurality of graphics is the same. In some of these examples, control unit 42 may store the data in the storage location of the SGPR if the uniform valid flag is asserted.

Shader core 24 (e.g., via control unit 42) may store data for the variable of each of the plurality of graphics items in multiple storage locations of GPR 26 if the data of the variable of at least two of the plurality of graphics items is not the same (104) (e.g., there are at least two graphics items whose data is different from each other). For example, as illustrated in FIG. 5B, control unit 42 may store the data for the variable for each of processing elements 48 in storage locations of GPR 26.

Control unit 42 may also receive a request for the stored data of the variable from each of processing elements 48 for processing respective graphics items. If the data is the same, control unit 42 may issue only one request for the data from SGPR 28. If the data is not the same, control unit 42 may issue requests from all of processing elements 48 for the data from GPR 26.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of storing data, the method comprising:
determining whether data of a variable for a plurality of graphics items is the same, wherein the variable is needed for processing each of the plurality of graphics items, wherein the plurality of graphics items are processed with respective processing elements of a shader core of a graphics processing unit (GPU) during execution of a shader program, wherein each of the graphics items is a base unit on which processing occurs, and wherein the shader program is stored in a system memory that is external to the GPU;

storing the data in a storage location of a shared general purpose register (SGPR) associated with the variable if the data of the variable of the plurality of graphics items is the same;

storing data for the variable of each of the plurality of graphics items in multiple storage locations of a general purpose register (GPR), separate from the SGPR, if the data of the variable of at least two of the plurality of graphics items is not the same, wherein the shader core includes the SGPR and the GPR and the SGPR and GPR are separate from the system memory that stores the shader program; and processing, with the respective processing elements, the data stored in the storage location of the SGPR or the multiple storage locations of the GPR.

2. The method of claim 1, wherein the data comprises attribute data of an attribute, and the variable comprises the attribute for the plurality of graphics items.

3. The method of claim 1, wherein determining whether the data of the variable of the plurality of graphics items is the same comprises determining whether an instruction in the shader program, generated by a compiler, indicates that the data of the variable of the plurality of graphics items is the same.

4. The method of claim 1, wherein determining whether the data of the variable of the plurality of graphics items is the same comprises:
determining whether memory addresses requested by the processing elements for the data, for processing respective graphics items, is the same;
determining that the data of the variable is the same for all of the graphics items if all of the memory addresses are the same; and
determining that the data of the variable is not the same for at least two of the graphics items if all of the memory addresses are not the same.

5. The method of claim 1, further comprising:
receiving a request for the stored data of the variable from each of the processing elements for processing respective graphics items; and
if the data is the same, issuing only one request for the data from the SGPR.

6. The method of claim 1, further comprising:
receiving a request for the stored data of the variable from each of the processing elements for processing respective graphics items; and
if the data is not the same, issuing requests from all of the processing elements for the data from the GPR.

7. The method of claim 1, wherein storing the data in the storage location of the SGPR associated with the variable if the data of the variable of the plurality of graphics items is the same comprises:
issuing only one request for the data from a memory address that is the same for the variable for all of the graphics items; and
retrieving the data only once for storage in the storage location of the SGPR associated with the variable.

8. The method of claim 1, further comprising:
asserting a uniform valid flag if it is determined that the data of the variable of the plurality of graphics items is the same,
wherein storing the data in the storage location of the SGPR comprises storing the data in the storage location of the SGPR if the uniform valid flag is asserted.

9. The method of claim 1, wherein the graphics items comprise one of a plurality of vertices or a plurality of pixels.

10. A device for processing data, the device comprising:
a system memory configured to store a shader program; and
a graphics processing unit (GPU) external to the system memory, the GPU comprising a shader core, the shader core comprising a control unit, a plurality of processing elements, a shared general purpose register (SGPR), and a general purpose register (GPR), wherein the SGPR and the GPR are separate from the system memory that stores the shader program, and wherein the control unit is configured to:
determine whether data of a variable for a plurality of graphics items is the same, wherein the variable is needed for processing each of the plurality of graphics items, wherein the plurality of graphics items are processed with respective processing elements of the shader core of the GPU during execution of a shader program, and wherein each of the graphics items is a base unit on which processing occurs;
store the data in a storage location of the SGPR associated with the variable if the data of the variable of the plurality of graphics items is the same; and
store data for the variable of each of the plurality of graphics items in multiple storage locations of the GPR, separate from the SGPR, if the data of the variable of at least two of the plurality of graphics items is not the same, and
wherein the respective processing elements are configured to process the data stored in the storage location of the SGPR or the multiple storage locations of the GPR.

11. The device of claim 10, wherein the data comprises attribute data of an attribute, and the variable comprises the attribute for the plurality of graphics items.

12. The device of claim 10, further comprising a processor, wherein the processor is configured to, at least one of:
encode an instruction that indicates that the data of the variable for the plurality of graphics items is the same from which the control unit determines whether the data is the same;
or generate instructions in the shader program that alias storage locations of the SGPR with variables of the graphics items.

13. The device of claim 10, wherein to determine whether the data of the variable of the plurality of graphics items is the same, the control unit is configured to:
determine whether memory addresses requested by the processing elements for the data of the variable, for processing respective graphics items, is the same;
determine that the data of the variable is the same for all of the graphics items if all of the memory addresses are the same; and
determine that the data of the variable is not the same for at least two of the graphics items if all of the memory addresses are not the same.

14. The device of claim 10, wherein the control unit is configured to:
receive a request for the stored data of the variable from each of the processing elements for processing respective graphics items; and
if the data is the same, issue only one request for the data from the SGPR.

15. The device of claim 10, wherein the control unit is configured to:
receive a request for the stored data of the variable from each of the processing elements for processing respective graphics items; and if the data is not the same, issue requests from all of the processing elements for the data from the GPR.

16. The device of claim 10, wherein to store the data in the storage location of the SGPR associated with the variable if the data of the variable of the plurality of graphics items is the same, the control unit is configured to:
   issue only one request for the data from a memory address that is the same for the variable for all of the graphics items; and
   retrieve the data only once for storage in the storage location of the SGPR associated with the variable.

17. The device of claim 10, wherein the control unit is configured to:
   assert a uniform valid flag if it is determined that the data of the variable of the plurality of graphics items is the same,
   wherein to store the data in the storage location of the SGPR, the control unit is configured to store the data in the storage location of the SGPR if the uniform valid flag is asserted.

18. The device of claim 10, wherein the graphics items comprise one of a plurality of vertices or a plurality of pixels.

19. The device of claim 10, wherein the device comprises: a wireless communication device.

20. A graphics processing unit (GPU) comprising a shader core, the shader core comprising:
   a plurality of processing elements;
   a shared general purpose register (SGPR);
   a general purpose register (GPR) separate from the SGPR; and
   a control unit configured to:
      determine whether data of a variable for a plurality of graphics items is the same, wherein the variable is needed for processing each of the plurality of graphics items, wherein the plurality of graphics items are processed with respective processing elements of the shader core of the GPU during execution of a shader program, wherein each of the graphics items is a base unit on which processing occurs, and wherein the shader program is stored in a system memory that is external to the GPU;
      store the data in a storage location of the SGPR associated with the variable if the data of the variable of the plurality of graphics items is the same; and
      store data for the variable of each of the plurality of graphics items in multiple storage locations of the GPR, separate from the SGPR, if the data of the variable of at least two of the plurality of graphics items is not the same, wherein the SGPR and GPR are separate from the system memory that stores the shader program, and
   wherein the respective processing elements are configured to process the data stored in the storage location of the SGPR or the multiple storage locations of the GPR.

21. The GPU of claim 20, wherein to determine whether the data of the variable of the plurality of graphics items is the same, the control unit is configured to:
   determine whether memory addresses requested by the processing elements for the data of the variable, for processing respective graphics items, is the same;
   determine that the data of the variable is the same for all of the graphics items if all of the memory addresses are the same; and
   determine that the data of the variable is not the same for at least two of the graphics items if all of the memory addresses are not the same.

22. The GPU of claim 20, wherein the control unit is configured to:
   receive a request for the stored data of the variable from each of the processing elements for processing respective graphics items; and
   if the data is the same, issue only one request for the data from the SGPR.

23. The GPU of claim 20, wherein the control unit is configured to:
   receive a request for the stored data of the variable from each of the processing elements for processing respective graphics items; and
   if the data is not the same, issue requests from all of the processing elements for the data from the GPR.

24. The GPU of claim 20, wherein to store the data in the storage location of the SGPR associated with the variable if the data of the variable of the plurality of graphics items is the same, the control unit is configured to:
   issue only one request for the data from a memory address that is the same for the variable for all of the graphics items; and
   retrieve the data only once for storage in the storage location of the SGPR associated with the variable.

25. The GPU of claim 20, wherein the control unit is configured to:
   assert a uniform valid flag if determined that the data of the variable of the plurality of graphics items is the same,
   wherein to store the data in the storage location of the SGPR, the control unit is configured to store the data in the storage location of the SGPR if the uniform valid flag is asserted.

26. The GPU of claim 20, wherein the graphics items comprise one of a plurality of vertices or a plurality of pixels.

27. A computer-readable storage medium having instructions stored thereon that when executed cause one or more processors to:
   determine whether data of a variable for a plurality of graphics items is the same, wherein the variable is needed for processing each of the plurality of graphics items, wherein the plurality of graphics items are processed with respective processing elements of a shader core of a graphics processing unit (GPU) during execution of a shader program, wherein each of the graphics items is a base unit on which processing occurs, and wherein the shader program is stored in a system memory that is external to the GPU;
   store the data in a storage location of a shared general purpose register (SGPR) associated with the variable if the data of the variable of the plurality of graphics items is the same;
   store data for the variable of each of the plurality of graphics items in multiple storage locations of a general purpose register (GPR), separate from the SGPR, if the data of the variable of at least two of the plurality of graphics items is not the same, wherein the shader core includes the SGPR and the GPR and the SGPR and GPR are separate from the system memory that stores the shader program; and
   cause the respective processing elements to process the data stored in the storage location of the SGPR or the multiple storage locations of the GPR.

* * * * *